(12) United States Patent
Stoppe et al.

(10) Patent No.: US 11,460,683 B2
(45) Date of Patent: Oct. 4, 2022

(54) DIGITAL DETERMINATION OF FOCUS POSITION

(71) Applicant: Carl Zeiss Microscopy GmbH, Jena (DE)

(72) Inventors: Lars Stoppe, Jena (DE); Thomas Milde, Nausnitz (DE); Andrea Berner, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 324 days.

(21) Appl. No.: 16/624,729

(22) PCT Filed: Jun. 21, 2018

(86) PCT No.: PCT/EP2018/066581
§ 371 (c)(1),
(2) Date: Dec. 19, 2019

(87) PCT Pub. No.: WO2019/007698
PCT Pub. Date: Jan. 10, 2019

(65) Prior Publication Data
US 2020/0257101 A1  Aug. 13, 2020

(30) Foreign Application Priority Data
Jul. 5, 2017  (DE) .................... 10 2017 115 021.8

(51) Int. Cl.
*G02B 7/36* (2021.01)
*G02B 21/24* (2006.01)
(Continued)

(52) U.S. Cl.
CPC .......... *G02B 21/244* (2013.01); *G01B 11/026* (2013.01); *G02B 7/36* (2013.01); *G02B 26/007* (2013.01)

(58) Field of Classification Search
CPC ...... G02B 21/244; G02B 7/36; G02B 26/007; G01B 11/026; G01B 11/0608; G03B 11/00; G03B 13/36
See application file for complete search history.

(56) References Cited

U.S. PATENT DOCUMENTS

| | | | |
|---|---|---|---|
| 3,904,869 A | 9/1975 | Stauffer | |
| 5,596,386 A * | 1/1997 | Hankawa | G02B 7/32 396/110 |

(Continued)

FOREIGN PATENT DOCUMENTS

| | | |
|---|---|---|
| CN | 1455294 A | 11/2003 |
| CN | 1808205 A | 7/2006 |

(Continued)

OTHER PUBLICATIONS

"First Office Action and English language translation", CN Application No. 201880045035.3, dated May 17, 2021, 30 pp.

(Continued)

Primary Examiner — Jonathan M Hansen
(74) Attorney, Agent, or Firm — Myers Bigel, P.A.

(57) ABSTRACT

A detection optical unit (112) of an optical apparatus is configured to produce an imaged representation (151, 152) of a sample object (150) on a detector (114). An adjustable filter element (119) is arranged in a beam path of the detection optical unit (112) that defines the imaged representation (151, 152). A controller is configured to drive the adjustable filter element (119) to filter the spectrum of the beam path with a first filter pattern (301-308) and with a second filter pattern (301-308) and to drive the detector (114) to capture a first image, associated with the first filter pattern (301-308), and to capture a second image, which is associated with the second filter pattern (301-308). The controller is furthermore configured to determine a focus position (181) of the sample object (150) based on the first (Continued)

image and the second image. The first filter element (301-308) here defines a first line and the second filter element (301-308) defines a second line.

17 Claims, 10 Drawing Sheets (51) Int. Cl.
  *G01B 11/02* (2006.01)
  *G02B 26/00* (2006.01)

(56) References Cited

U.S. PATENT DOCUMENTS

| | | | |
|---|---|---|---|
| 6,700,615 B1* | 3/2004 | Satoh | H04N 5/232123 396/128 |
| 7,561,789 B2* | 7/2009 | Border | H04N 5/232123 396/459 |
| 8,625,195 B2 | 1/2014 | Lin et al. | |
| 2002/0039489 A1 | 4/2002 | Matsuda | |
| 2008/0002959 A1* | 1/2008 | Border | H04N 5/232123 348/E5.045 |
| 2008/0225278 A1 | 9/2008 | Namba et al. | |
| 2009/0059101 A1 | 3/2009 | Wang et al. | |
| 2010/0085650 A1 | 4/2010 | Wu et al. | |
| 2010/0157082 A1* | 6/2010 | Katerberg | G03B 17/14 348/222.1 |
| 2012/0120383 A1 | 5/2012 | Ogino | |
| 2012/0229696 A1 | 9/2012 | Hashimoto | |
| 2013/0107104 A1 | 5/2013 | Uchida et al. | |
| 2013/0120564 A1 | 5/2013 | Imamura | |
| 2013/0235250 A1 | 9/2013 | Fainstain | |
| 2015/0054937 A1 | 2/2015 | Lippert et al. | |
| 2016/0171679 A1* | 6/2016 | Ishiwata | H04N 13/207 348/46 |
| 2017/0031146 A1 | 2/2017 | Zheng | |

FOREIGN PATENT DOCUMENTS

| | | |
|---|---|---|
| CN | 1932632 A | 3/2007 |
| CN | 101278190 A | 10/2008 |
| CN | 101283234 A | 10/2008 |
| CN | 101480042 A | 7/2009 |
| CN | 101509998 A | 8/2009 |
| CN | 101796448 A | 8/2010 |
| CN | 101868320 A | 10/2010 |
| CN | 102227665 A | 10/2011 |
| CN | 102265596 A | 11/2011 |
| CN | 103026170 A | 4/2013 |
| CN | 103038689 A | 4/2013 |
| CN | 103379277 A | 10/2013 |
| CN | 103873770 A | 6/2014 |
| CN | 106470299 A | 3/2017 |
| DE | 102012009836 A1 | 11/2013 |
| DE | 10 2014 109 687 A1 | 1/2016 |
| EP | 0 854 373 A1 | 7/1998 |
| EP | 1408360 A2 | 4/2004 |
| JP | 58-77308 U | 5/1983 |
| JP | 2012008431 A | 1/2012 |
| JP | 2013-235110 A | 11/2013 |
| KR | 20140120467 A | 10/2014 |

OTHER PUBLICATIONS

International Search Report and Written Opinion of the International Searching Authority, International Application No. PCT/EP2018/066581, dated Sep. 4, 2018, 19 pp.
Recherchebericht (Search Report), DE Application No. 10 2017 115 021.8, dated Mar. 19, 2018, 11 pp.
"Second Office Action and English language translation", CN Application No. 201880045035.3, dated Mar. 8, 2022, 12 pp.
"Notification To Go Through Formalities of Registration" with English language translation, CN Application No. 201880045035.3, dated Jun. 8, 2022, 8 pp.
Chen, Guojin , et al., "Research on CMOS Image Preprocess Methods for Auto-Focusing System", VECIMS 2007—IEEE International Conference on Virtual Environments, Human Computer Interfaces, and Measurement Systems, Ostuni, Italy, Jun. 25, 2007, pp. 125-130.

* cited by examiner

DIGITAL DETERMINATION OF FOCUS POSITION

CROSS REFERENCE TO RELATED APPLICATIONS

This application is a 35 U.S.C. § 371 national stage application of PCT International Application No. PCT/EP2018/066581, filed on Jun. 21, 2018, which itself claims the benefit of and priority to German Application No. 10 2017 115 021.8, filed Jul. 5, 2017, the disclosure and content of both of which are incorporated by reference herein in their entireties.

TECHNICAL FIELD

Various examples of the invention generally relate to the determination of a focus position of a sample object. Various examples of the invention in particular relate to the determination of the focus position based on a plurality of images associated with different filter patterns for filtering the spectrum of a beam path of a detection optical unit.

BACKGROUND

The determination of the position of a sample object along an optical axis of a detection optical unit of an optical apparatus (Z-position or focus position)—i.e. the distance of the sample object from a focal plane of the detection optical unit—can be desirable for various reasons. For example, it may be possible using the determined focus position to position the sample object as well as possible in the focal plane of the detection optical unit. In this way, it is possible to produce a sharp imaged representation of the sample object. This is referred to as autofocus application. In the case of objects extending perpendicularly to the optical axis it may be desirable to determine the focus position for different points of the sample object perpendicular to the optical axis in order to be able to focus the relevant image segment. It may also be desirable to determine a height profile of the sample object based on the focus position.

Existing techniques allow the focus position to be determined e.g. via a positioning of the sample object at different reference positions. The focus position can then be determined on the basis of a sharpness of an imaged representation of the sample object at the different reference positions. However, determining the sharpness of the imaged representation of the sample object may often be possible only with a limited accuracy. For this reason, such reference implementations can be relatively inaccurate.

Further existing techniques employ interferometric approaches for determining the focus position. While such techniques allow a comparatively high accuracy when determining the focus position, the corresponding apparatuses may be comparatively complicated and expensive. In addition, the capture region for focus detection can be severely limited.

Further existing techniques employ the illumination of the sample object from different illumination directions. This is followed by a digital evaluation of corresponding images to determine the focus position. Corresponding techniques are described e.g. in DE 10 2014 109 687 A1. However, sometimes it may be difficult to integrate an illumination module that permits such structured illumination from different illumination directions into an optical apparatus. This can be the case in telecentric systems.

BRIEF SUMMARY OF THE INVENTION

Therefore, there is a need for improved techniques for determining the focus position of a sample object. In particular, there is a need for such techniques which eliminate at least some of the disadvantages and limitations mentioned above.

This object is achieved by the features of the independent patent claims. The features of the dependent patent claims define embodiments.

In one example, an optical apparatus comprises a detection optical unit. The detection optical unit is configured to produce an imaged representation of a sample object on a detector. The optical apparatus also comprises the detector and an adjustable filter element. The adjustable filter element is arranged in a beam path of the detection optical unit. The beam path defines the imaged representation. The optical apparatus furthermore comprises a controller. The controller is configured to drive the adjustable filter element to filter the spectrum of the beam path with a first filter pattern and with a second filter pattern. The controller is additionally configured to drive the detector to capture a first image, associated with the first filter pattern, and to capture a second image, which is associated with the second filter pattern. The controller is also configured to determine a focus position of the sample object based on the first image and based on the second image. The first filter pattern defines a first line. The second filter pattern defines a second line.

In a further example, a method comprises driving a filter element arranged in a beam path, which defines an imaged representation of a sample object, to filter the spectrum of the beam path with a first filter pattern and with a second filter pattern. The method also comprises driving a detector to capture a first image, associated with the first filter pattern, and to capture a second image, which is associated with the second filter pattern. The method also comprises determining a focus position of the sample object based on the first image and on the second image. The first filter pattern defines a first line. The second filter pattern defines a second line.

In a further example, a computer program product comprises program code which can be executed by at least one computing unit. Executing the program code causes the at least one computing unit to carry out a method. The method comprises driving a filter element arranged in a beam path, which defines an imaged representation of a sample object, to filter the spectrum of the beam path with a first filter pattern and with a second filter pattern. The method also comprises driving a detector to capture a first image, associated with the first filter pattern, and to capture a second image, which is associated with the second filter pattern. The method also comprises determining a focus position of the sample object based on the first image and on the second image. The first filter pattern defines a first line. The second filter pattern defines a second line.

In a further example, a computer program product comprises program code which can be executed by at least one computing unit. Executing the program code causes the at least one computing unit to carry out a method. The method comprises driving a filter element arranged in a beam path, which defines an imaged representation of a sample object, to filter the spectrum of the beam path with a first filter pattern and with a second filter pattern. The method also comprises driving a detector to capture a first image, associated with the first filter pattern, and to capture a second image, which is associated with the second filter pattern. The method also comprises determining a focus position of the sample object based on the first image and on the second image. The first filter pattern defines a first line. The second filter pattern defines a second line.

In one example, an optical apparatus comprises a detection optical unit. The detection optical unit is configured to produce an imaged representation of a sample object on a detector. The optical apparatus also comprises the detector and an adjustable filter element. The adjustable filter element is arranged in a beam path of the detection optical unit. The beam path defines the imaged representation. The optical apparatus furthermore comprises a controller. The controller is configured to drive the adjustable filter element to filter rays of the beam path that have a first angle in relation to a sensor surface of the detector and that have a second angle in relation to the sensor surface. The controller is furthermore configured to drive the detector to capture a first image, associated with the rays having the first angle; and to capture a second image, which is associated with the rays having the second angle. The controller is also configured to determine a focus position of the sample object based on the first image and based on the second image.

In a further example, a method comprises driving a filter element. The filter element is arranged in a beam path that defines an imaged representation of a sample object. The driving takes place for filtering rays of the beam path that have a first angle in relation to a sensor surface of a detector and that have a second angle in relation to the sensor surface. The method also comprises driving the detector to capture a first image, associated with the rays having the first angle; and to capture a second image, which is associated with the rays having the second angle. The method also comprises determining a focus position of the sample object based on the first image and on the second image.

In a further example, a computer program product comprises program code which can be executed by at least one computing unit. Executing the program code causes the at least one computing unit to carry out a method. The method comprises driving a filter element. The filter element is arranged in a beam path that defines an imaged representation of a sample object. The driving takes place for filtering rays of the beam path that have a first angle in relation to a sensor surface of a detector and that have a second angle in relation to the sensor surface. The method also comprises driving the detector to capture a first image, associated with the rays having the first angle; and to capture a second image, which is associated with the rays having the second angle. The method also comprises determining a focus position of the sample object based on the first image and on the second image.

In a further example, a computer program product comprises program code which can be executed by at least one computing unit. Executing the program code causes the at least one computing unit to carry out a method. The method comprises driving a filter element. The filter element is arranged in a beam path that defines an imaged representation of a sample object. The driving takes place for filtering rays of the beam path that have a first angle in relation to a sensor surface of a detector and that have a second angle in relation to the sensor surface. The method also comprises driving the detector to capture a first image, associated with the rays having the first angle; and to capture a second image, which is associated with the rays having the second angle. The method also comprises determining a focus position of the sample object based on the first image and on the second image.

The features set out above and features that are described below may be used not only in the corresponding combinations explicitly set out, but also in further combinations or in isolation, without departing from the scope of protection of the present invention.

DETAILED DESCRIPTION OF EMBODIMENTS

The properties, features and advantages of this invention described above and the way in which they are achieved will become clearer and more clearly comprehensible in association with the following description of the exemplary embodiments which are explained in greater detail in association with the drawings.

The present invention is explained in greater detail below on the basis of preferred embodiments with reference to the drawings. In the figures, identical reference signs denote identical or similar elements. The figures are schematic representations of different embodiments of the invention. Elements illustrated in the figures are not necessarily depicted as true to scale. Rather, the various elements illustrated in the figures are rendered in such a way that their function and general purpose become comprehensible to the person skilled in the art. Connections and couplings between functional units and elements as illustrated in the figures may also be implemented as an indirect connection or coupling. A connection or coupling may be implemented in a wired or wireless manner. Functional units may be implemented as hardware, software or a combination of hardware and software.

Techniques for determining the focus position of a sample object will be described below. The focus position typically describes a distance between the focal plane and the sample object parallel to the optical axis, i.e. in the Z-direction. Various applications can be implemented on the basis of the determined focus position. For example, it would be possible to implement an autofocus application. That means that it is possible, on the basis of the determined focus position, for a sample holder that is operated for example mechanically and releasably fixes the sample object to be adjusted parallel to the optical axis of a detection optical unit such that the sample object is arranged in a focus plane of the detection optical unit. The distance of this movement can correspond to the focus position. A further application that may benefit from the techniques described herein for determining the focus position is the creation of a height profile of the sample object. For example, the sample object can have a significant extent perpendicular to the optical axis (lateral plane, XY-plane) and also a topology within the lateral plane, i.e. a variation of the focus position as a function of the position within the lateral plane. This can be captured by spatially resolved determination of the focus position for different positions within the lateral plane, and a corresponding height profile can be created. A further application that may benefit from the techniques described herein for determining the focus position is the tracking of the focus position in the case of moving sample objects. For example in the context of biological cell cultures, a movement of individual cells can be tracked by repeated determination of the focus position and a continuous autofocus application can be implemented.

The techniques described herein make the determination of the focus position of the sample object with a large capture region possible. That means that a reliable determination of the focus position can be performed even for sample objects that are arranged in a comparatively defocused manner. The techniques described herein furthermore make possible the fast determination of the focus position of the sample object; the focus position of the sample object can be determined reliably within a particularly short time period, e.g. within milliseconds. This enables for example operation parallel with the optical apparatus—for example a microscope. Long-term measurements on moving samples are made possible.

The examples described herein are based on the digital evaluation of different images. The different images correspond to the selection of different angles from which light from the sample object is incident on a sensor surface of a detector.

Various examples of the techniques described herein are based on amplitude filtering of the imaging spectrum of the sample object in or near a pupil plane of the detection optical unit of the optical apparatus. This corresponds to the filtering of specific angles at which rays are incident on a sensor surface of the detector; i.e. individual rays are selectively transmitted in accordance with their angle in relation to the sensor surface. Different filter patterns are used; for each filter pattern, an associated image is captured by way of a detector. The different images can then be compared to determine the focus position.

Different filter patterns can be used in the various examples described herein. For example, it may then be possible that each filter pattern defines at least one light-transmissive region, which is surrounded by an opaque region. For example, the light-transmissive region can be arranged at a distance from the optical axis of a beam path, which is defined by the detection optical unit, i.e. it can be arranged off-axis. In some examples it is possible that the light-transmissive region is configured to be line-shaped, i.e. that the corresponding filter pattern defines a line. Only rays having angles in a narrowly limited angle range will then be transmitted. The filter patterns used can be transformed into one another for example by way of translation along a vector. A filter pattern can also be implemented as an amplitude mask. However, the filter patterns do not necessarily have to be implemented as amplitude masks. It is also possible to use liquid-crystal displays having a plurality of pixels or micromirror devices (DMDs) or laser scanners for filtering.

When using a suitable filter pattern—for example a filter pattern having a line-shaped light-transmissive region that is arranged off-axis—a sample object which is arranged in a defocused manner is presented as being offset. If two images that are associated with different filter patterns are captured, the focus position can be determined from a distance of the positions of the imagings of the sample object in the two images.

Figure 1:
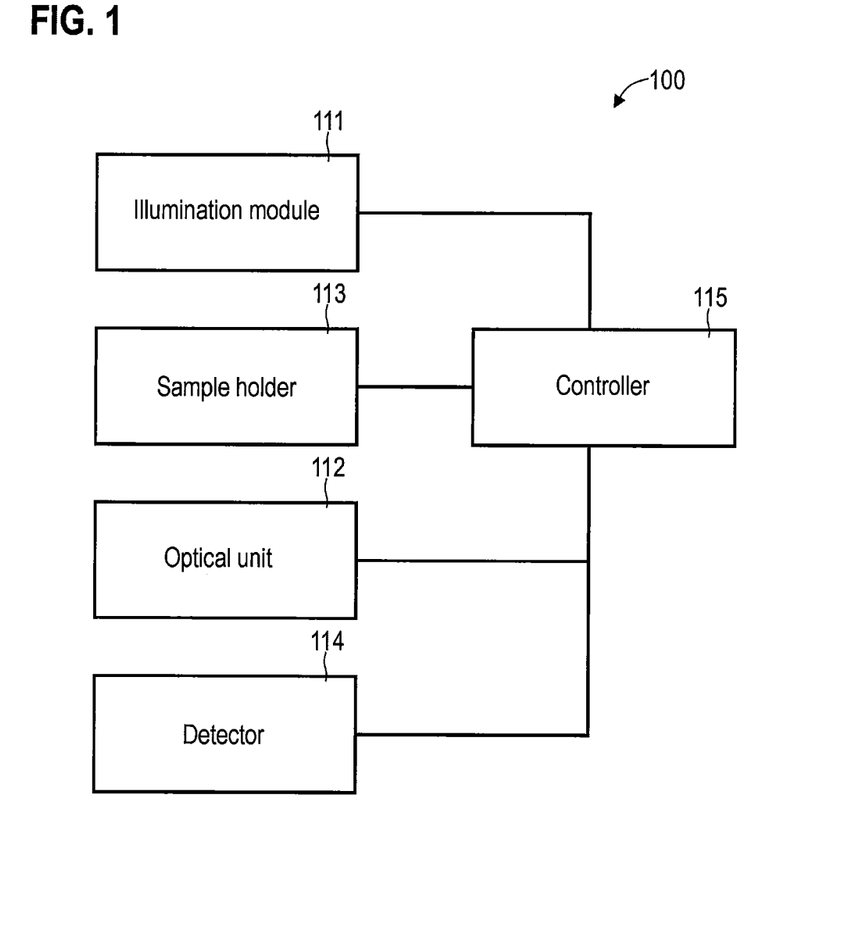
FIG. 1 schematically illustrates an optical apparatus in accordance with various examples.

FIG. 1 illustrates an exemplary optical apparatus 100. By way of example, the optical apparatus 100 in accordance with the example in FIG. 1 can implement a light microscope, for example in transmitted-light geometry. It would also be possible for the optical apparatus 100 to implement a laser scanning microscope or a fluorescence microscope. The optical apparatus 100 may allow the magnified representation of small structures of a sample object secured by a sample holder 113. A detection optical unit 112 is configured to produce an imaged representation of a sample object on a detector 114. Then, the detector 114 can be configured to detect one or more images of the sample object. Observation through an eyepiece is likewise possible.

An illumination module 111 is configured to illuminate the sample object fixed on the sample holder 113. By way of example, this illumination could be implemented by means of Köhler illumination. Here, use is made of a condenser lens and a condenser aperture stop. This leads to a particularly homogeneous intensity distribution of the light used for illumination purposes in the plane of the sample object. By way of example, a partially incoherent illumination can be implemented.

A controller 115 is provided to drive the various components 111-114 of the optical apparatus 100. For example, the controller 115 could be configured to drive a motor of the sample holder 113 to implement an autofocus application. By way of example, the controller 115 could be implemented as a microprocessor or microcontroller. As an alternative or in addition thereto, the controller 115 could comprise an FPGA or ASIC, for example.

Figure 2:
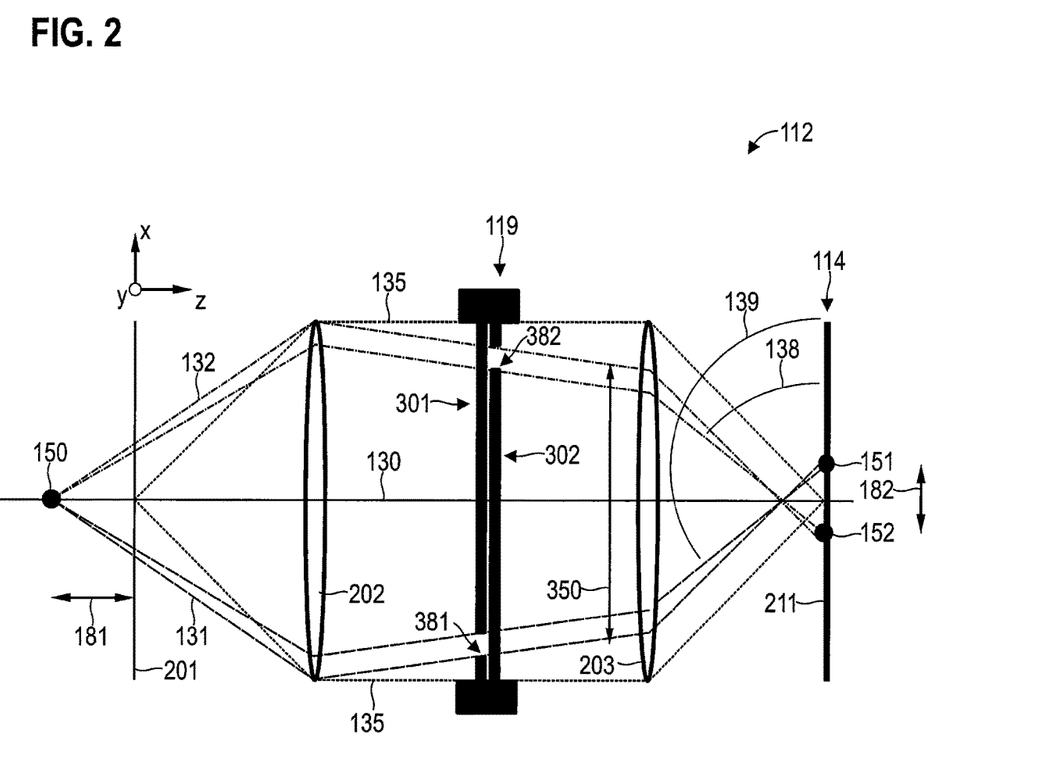
FIG. 2 schematically illustrates a detection optical unit with an adjustable filter element of an optical apparatus in accordance with various examples.

FIG. 2 illustrates aspects relating to the detection optical unit 112. FIG. 2 illustrates an exemplary implementation of the detection optical unit 112 with an adjustable filter element 119. The filter element 119 is arranged in the region of a conjugated plane of the beam path 135, that is to say near or close to a pupil plane of the beam path 135. Therefore, filtering of the (spatial frequency) spectrum of the beam path 135 takes place. In real space, this corresponds to the selection of different angles 138, 139, at which the light is incident on the sensor surface 211 along corresponding rays 131, 132 from the sample object 150. The filter element 119 also forms an aperture stop. The beam path 135 is implemented by way of lenses 202, 203.

FIG. 2 shows the rays 131, 132 of the beam path 135 starting from a sample object 150, which is arranged in a defocused manner, through the detection optical unit 112 up to the detector 114, that is to say in particular a sensor surface 211 of the detector 114. The rays 131 (dashed lines in FIG. 2) here corresponds to a filter pattern 301, which defines a first light-transmissive region 381 having an extent in the X-direction, while the rays 132 (dashed-dotted lines in FIG. 2) correspond to a filter pattern 302, which defines a second light-transmissive region 382 having an extent in the X-direction. The sample object 150 is arranged in a defocused manner and has a focus position 181, which is not equal to zero. Therefore, the rays are incident on the sensor surface 211 at different angles 138, 139 (angle-selective detection). In addition, the imaged representations 151, 152 of the sample object 150 are spaced apart from one another.

Owing to a focus position 181 that is not equal to zero—i.e. a distance of the position of the sample object 150 along the optical axis 130 from the focal plane 201 of the detection optical unit 112—the imaged representations 151, 152 of the sample object 150 that are brought about by the rays 131, 132 are positioned on the sensor surface 211 in a manner spaced apart by a distance 182. Here, the distance 182 is dependent on the focus position 181:

$$\Delta z = \frac{\Delta x}{2\frac{\Delta k}{\phi P} \cdot m \cdot NA} \sqrt{1 - \left(\frac{\frac{\Delta k}{\phi P} NA}{m}\right)^2}$$

wherein $\Delta z$ denotes the focus position 181, $\Delta x$ denotes the distance 182, $\emptyset P$ denotes the diameter of the aperture stop, $\Delta k$ denotes the length of the distance between the light-transmissive regions of the filter patterns 301, 302, m denotes the magnification of the detection optical unit 112, and NA denotes a correction value based on the oblique angle of incidence 138, 139. NA can be determined for example empirically or by beam path calculation.

The equation shown is an approximation. In some examples it may be possible to further take into account a dependence of the angle of incidence 138, 139 on the focus position 181, i.e. $\Delta z$. This dependence can be system-specific.

In principle, it may be desirable in various examples to define particularly thin light-transmissive regions 381, 382— i.e. a small extent in the X-direction. This can make possible a particularly high accuracy when determining the distance 182 and thus the focus position 181. On the other hand, the intensity on the sensor surface 211 is decreased on account of a small extent of the light-transmissive regions in the X-direction. For this reason, a balance can be struck between intensity and accuracy. It is furthermore evident from FIG. 2 that the zero order of the light diffracted by the sample object 150 is not detected; for this reason, the intensity is comparatively low.

FIG. 2 is a one-dimensional illustration of the filter patterns 301, 302. In some examples, however, it is also possible to use filter patterns that have a two-dimensional extent, i.e. an extent in the XY-plane.

Figure 3:
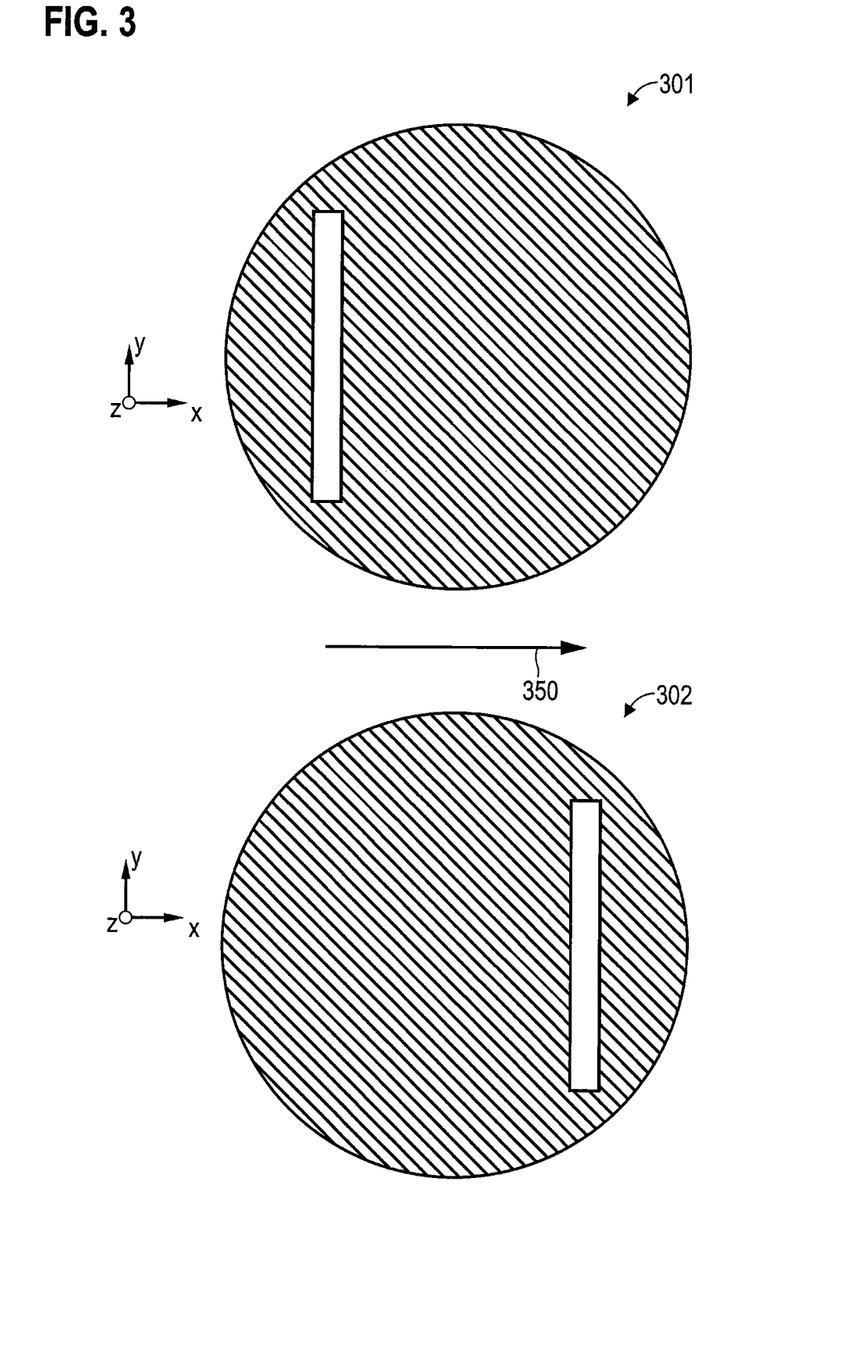
FIG. 3 illustrates exemplary filter patterns that can be implemented by the filter element.

FIG. 3 illustrates aspects in relation to exemplary filter patterns 301, 302. In the example in FIG. 3, the filter pattern 301 defines a line, and the filter pattern 302 defines a further line. The filter pattern 301 can be transformed into the filter pattern 302 by way of translation along the vector 350. The lines of the filter patterns 301, 302 are parallel along their entire lengths. Generally, it would also be possible to use lines which run parallel with respect to one another along only some of their lengths, for example along at least 50% of their lengths or along at least 80% of their lengths. In this way, a more flexible choice of filter patterns 301, 302 can be ensured.

It is evident from FIG. 3 that the lines of the filter patterns 301, 302 are arranged off-axis in relation to the optical axis 130. As a result, the length of the vector 350 can be maximized, as a result of which the distance 182 between the imaged representations 151, 152 can be maximized. In this way, the focus position 181 can again be determined particularly reliably.

By using the filter patterns 301, 302, which can be transformed into one another by way of translation along the vector 350, it is possible to obtain a one-dimensional spacing of the imaged representations 151, 152. The distance 182 is then parallel to the vector 350. This can make possible a particularly simple determination of the focus position 181, in particular compared to techniques that use different filter patterns that cannot be transformed into one another by way of a simple translation. However, it would be possible in some examples to use such complex filter patterns—which can be transformed into one another for example by way of rotation or distortion.

Figure 4:
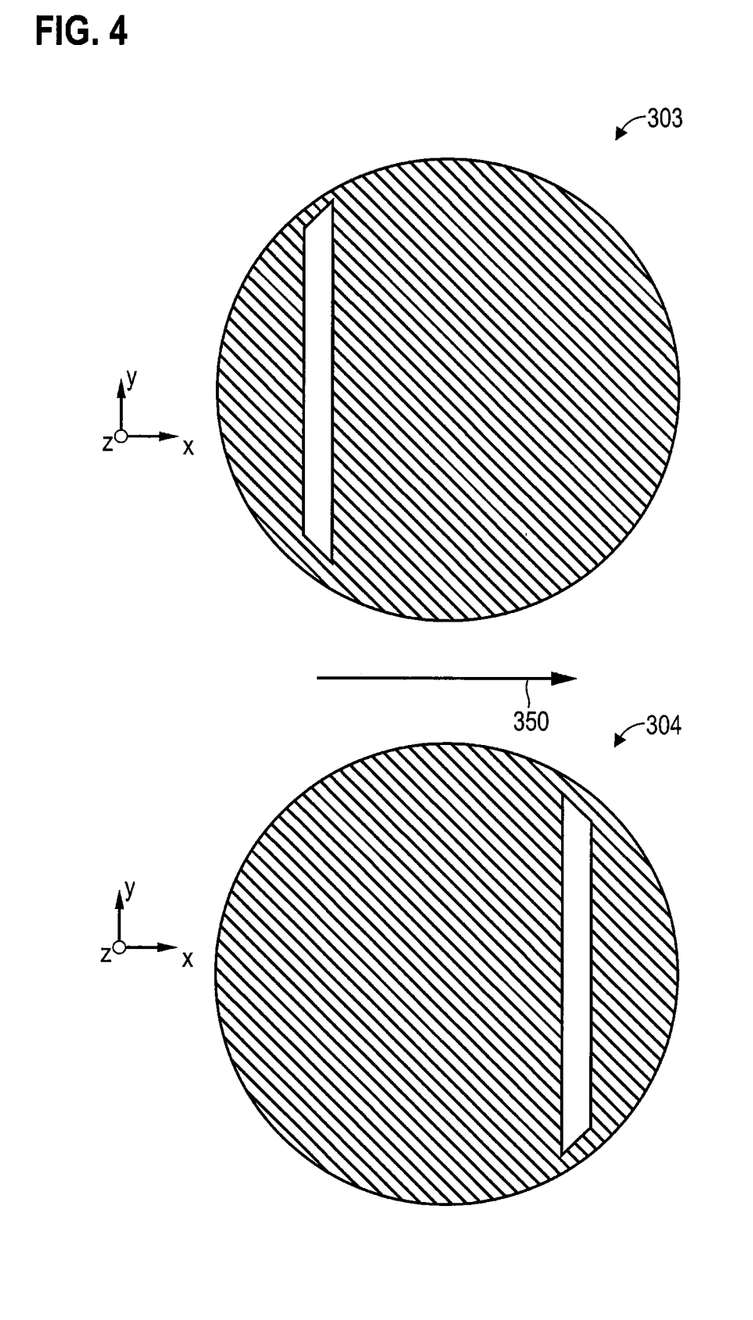
FIG. 4 illustrates exemplary filter patterns that can be implemented by the filter element.

FIG. 4 illustrates aspects in relation to exemplary filter patterns 303, 304. The filter patterns also define lines in the example of FIG. 4. It is again possible in a central region of said lines to transform the filter patterns 303, 304 into one another by way of translation along the vector 350.

Figure 5:
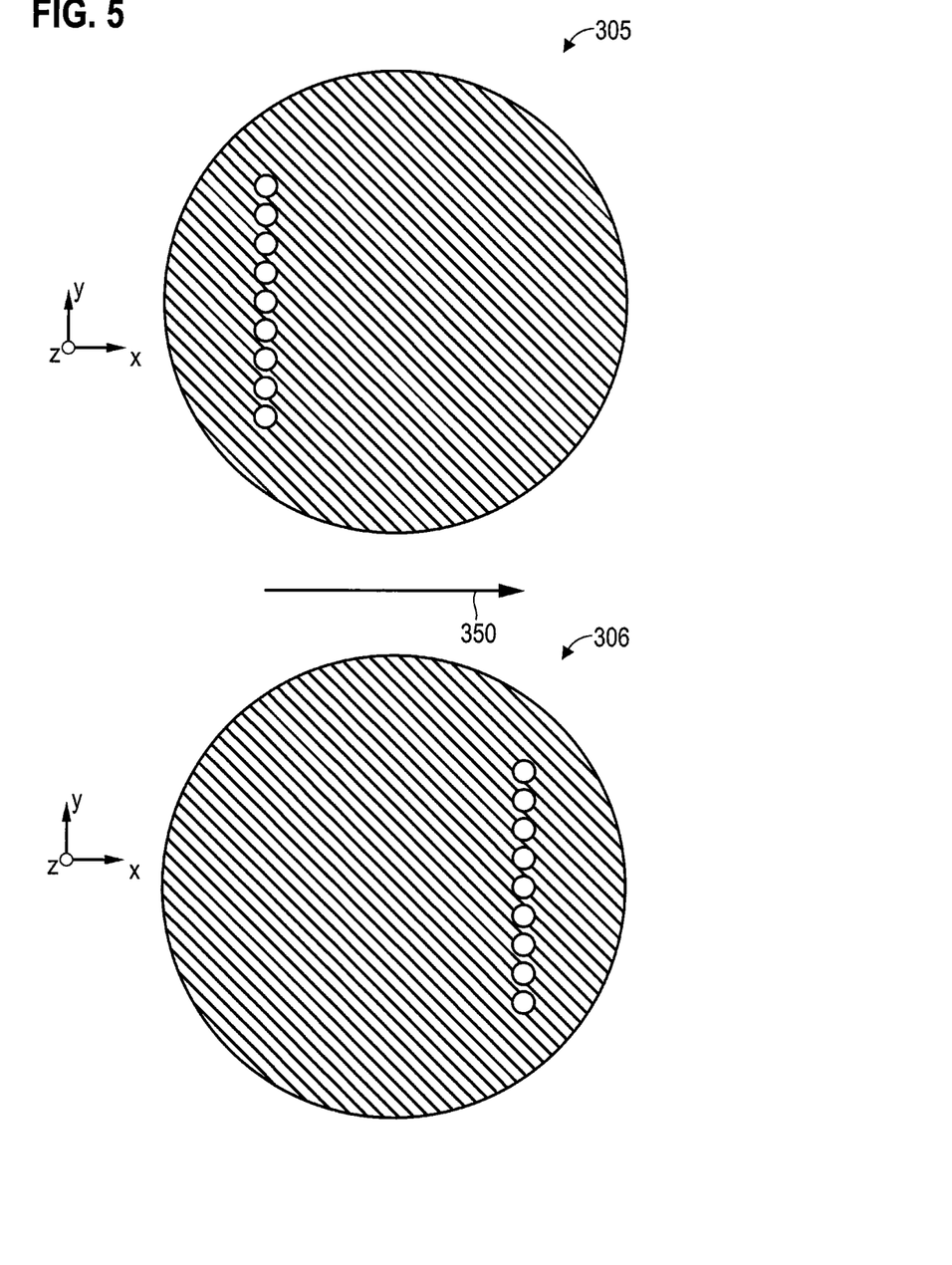
FIG. 5 illustrates exemplary filter patterns that can be implemented by the filter element.

FIG. 5 illustrates aspects in relation to exemplary filter patterns 305, 306. The filter patterns 305, 306 also define lines in the example of FIG. 5. These lines are formed by way of a plurality of holes (pinholes) which are arranged in a manner such that they are spaced apart from one another. The filter pattern 305 can be transformed into the filter pattern 306 by way of translation along the vector 350.

Figure 6:
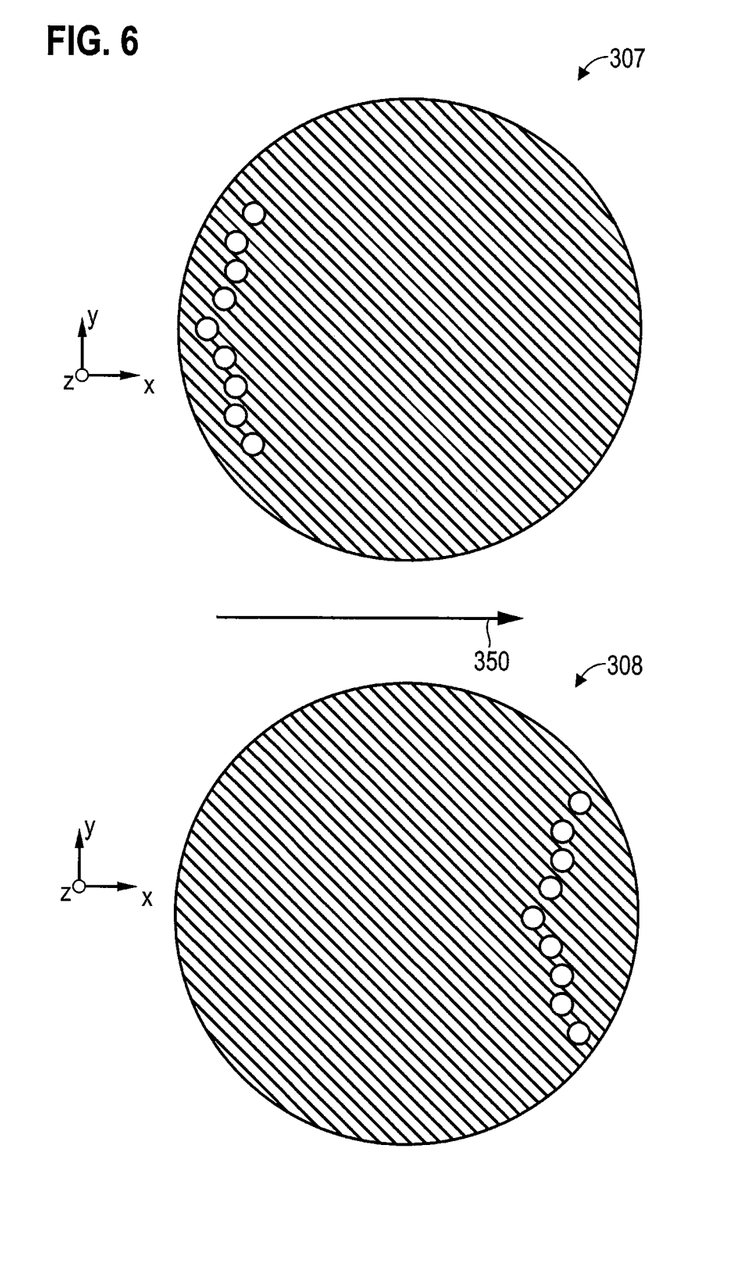
FIG. 6 illustrates exemplary filter patterns that can be implemented by the filter element.

FIG. 6 illustrates aspects in relation to exemplary filter patterns 307, 308. The filter patterns 307, 308 also define lines in the example in FIG. 6, wherein said lines of the filter patterns 307, 308 are curved—unlike the straight lines of the filter patterns 301-306. The filter pattern 307 can be transformed into the filter pattern 308 by way of translation along the vector 350.

The different filter patterns 301-308, as have been discussed above with respect to FIGS. 3-6, can be implemented by a wide variety of hardware implementations of the filter element 119. For example, it would be possible for the filter element 119 to be implemented by way of a filter wheel that has a single light transmissive region—for example in the form of a line; in that case, a first filter pattern can be defined when the filter wheel is set to 0°, and a second filter pattern can be defined when the filter wheel is set to 180°. Other examples of hardware implementations of the filter element 119 concern for example a digital micromirror device (DMD), a liquid-crystal filter, or movable or interchangeable filter plates. In this way, it is possible to provide in particular filter elements that are configured to perform amplitude filtering of the light.

Figure 7:
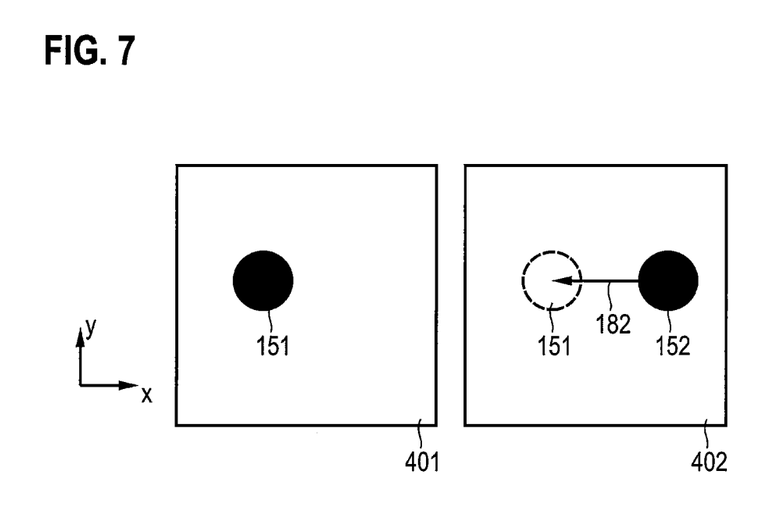
FIG. 7 illustrates images that are associated, in accordance with various examples, with different filter patterns.

FIG. 7 illustrates aspects in relation to images 401, 402, which were captured using the detector 114. Here, the image 401 corresponds to an illumination of the sensor surface 211 of the detector 114 with the use of the filter pattern 301; the image 402 corresponds to an illumination of the sensor surface 211 of the detector 114 with the use of the filter pattern 302 (compare FIGS. 2 and 3). The image 402 also shows the distance 182. On account of the use of the filter patterns 301, 302, the images 401, 402 have a comparatively low resolution.

The images 401, 402 can be pre-processed. For example, for each image point, the average contrast value over all image points could be subtracted from the corresponding contrast value, i.e. normalization could be performed. $I_m' = |I_m - \langle I \rangle|$, wherein m indicates the different image points, I indicates the respective contrast value.

In the various examples described herein, it is possible for the focus position 181 of the sample object 150 to be determined based on the image 401 and also based on the image 402. In particular, it would be possible for the focus position 181 to be determined based on the distance 182 of the position of the imaged representation 151 of the sample object 150 in the image 401 from the position of the imaged representation 152 of the sample object 150 in the image 402. See, for example, the equation above.

Figure 8:
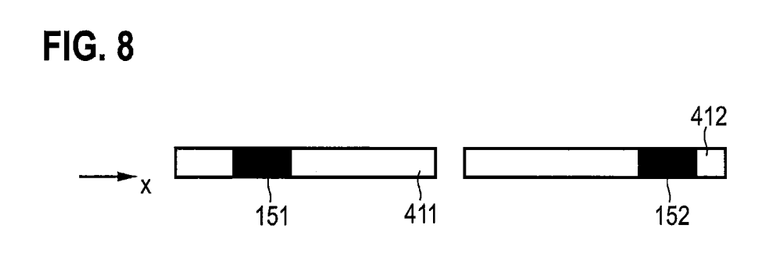
FIG. 8 illustrates images that are associated, in accordance with various examples, with different filter patterns.

Depending on the complexity of the structure of the sample object 150, it may be necessary to determine the distance 182 by using suitable techniques. For example, in a comparatively simple scenario, object detection for determining the position of the imaged representation 151, 152 of the sample object in the corresponding image 401, 402 could be performed. As part of the object detection, local contrast values of the corresponding image 401, 402 could for example be compared to an averaged contrast value. Edge detection could be performed. Likewise, landmark detection could be performed. For example, the sample object could exhibit particularly marked structures which are known a priori; such structures could then be identified as part of the landmark detection. A one-dimensional or two-dimensional correlation of the images 401, 402 would likewise be possible. For example, the orientation of the vector 350 could be taken into account: owing to the orientation of the vector 350, it is known that the positions of the imaged representations 151, 152 are also spaced apart in the X-direction. For this reason, it would be possible to perform averaging of the contrast values of the different image points of the images 401, 402 along the Y-direction, such that one-dimensional images 411, 412 (cf. FIG. 8) are obtained. A one-dimensional correlation between said images 411, 412 in the X-direction could then be performed to determine the distance 182. Typically, such techniques can be used to reduce signal noise, and the distance 182—and consequently the focus position 181—can be determined particularly accurately. Generally, it is possible to achieve greater accuracy on account of the reduction in the degrees of freedom when identifying the distance 182—for example by taking the orientation of the vector 350 into account.

Figure 9:
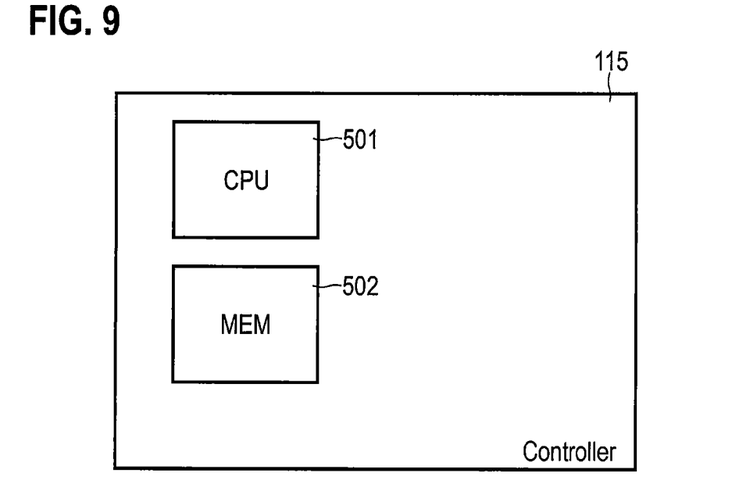
FIG. 9 schematically illustrates aspects in relation to a controller for an optical apparatus in accordance with various examples.

FIG. 9 illustrates aspects relating to the controller 115. The controller 115 comprises a computing unit 501, for example a microprocessor, an FPGA, or an ASIC. In addition, the controller 115 also comprises a memory 502, for example a non-volatile memory. It is possible that program code is stored in the memory 502. The program code can be loaded and executed by the computing unit 501. In that case, the computing unit 501 can be configured to perform, based on the program code, techniques for determining the focus position, as have been described in connection with the examples described herein. By way of example, the computing unit 501 could be configured to carry out the method according to the flowchart of FIG. 10.

Figure 10:
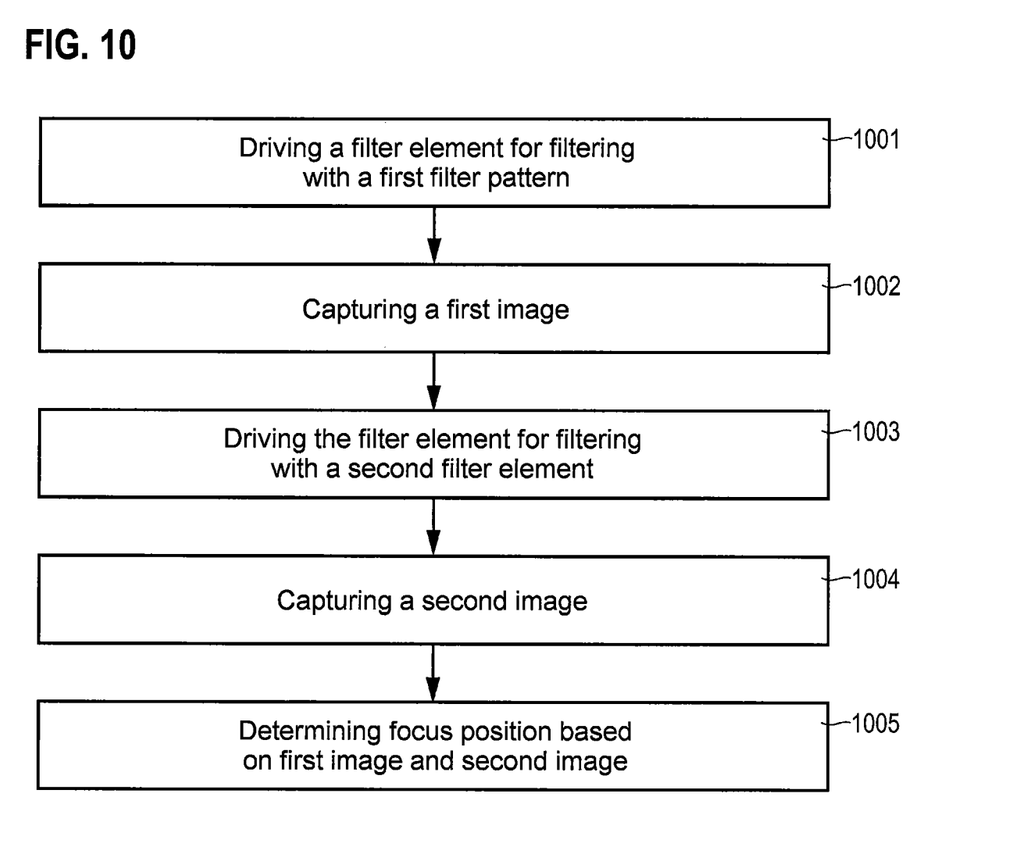
FIG. 10 is a flowchart of one exemplary method.

FIG. 10 is a flowchart of one exemplary method. First, in block 1001, a filter element is driven to filter light, coming from a sample object, with a first filter pattern. In block 1002, a first image is captured. The first image is captured during the filtering with the first filter pattern in block 1002. The first filter pattern can be arranged in the region of a conjugate plane of a detection optical unit, which defines a beam path of the light, with the result that the first image in real space includes a complete imaged representation of the sample object at a specific position despite the filtering. Said specific position is dependent on the focus position of the sample object, that is to say on the distance between the sample object and a focal plane that is defined by the detection optical unit. Filtering with the first filter pattern corresponds to the selective transmission of rays of the beam path that have a corresponding angle in relation to the sensor surface of a detector.

Next, in block 1003, the filter element is driven to filter the light with a second filter pattern. In block 1004, a second image is captured. The second image is captured during the filtering with the second filter pattern in block 1004. The second filter pattern can again be arranged in the region of the conjugate plane of the detection optical unit, with the result that the second image also includes a complete imaged representation of the sample object at a corresponding position. This position is also dependent on the focus position of the sample object. Filtering with the second filter pattern corresponds to the selective transmission of rays of the beam path that have again a corresponding angle in relation to the sensor surface of a detector.

Based on the first image from block 1002 and based on the second image from block 1004, the focus position can be determined in block 1005. In particular, it would be possible in block 1005 to take a distance between the positions of the imaged representations of the sample object in the first image and in the second image into account, for example in accordance with the aforementioned equation.

In some cases, it would be possible for blocks 1001, 1002, 1003 and 1004 to be performed at least partially in parallel in terms of time. For example, it would be possible for the filtering with the first filter pattern to define a light-transmissive region that permits transmission of light in a first wavelength range; correspondingly, filtering with the second filter pattern can define a further light-transmissive region that permits transmission of light in a second wavelength range. The first wavelength range and the second wavelength range can differ from one another. In this way, the light that is associated with the first filter pattern and the light that is associated with the second filter pattern can be separated by the wavelengths. If a wavelength-resolved detector (e.g. a red, green, blue sensor) is used, it may consequently be possible to capture the first image and the second image in parallel in terms of time or not to perform a reconfiguration of the filter element between the filtering with the first filter pattern and the second filter pattern. As a result, the time period required to determine the focus position can be reduced. This facilitates fast autofocus applications. In addition, the time period between the capturing of the first image and of the second image can be reduced, as a result of which motion artifacts or time drifts can be reduced.

While coding the light that has been filtered by the first filter pattern or the second filter pattern by way of different wavelengths or colors has been described above, it would in other examples also be possible for such coding to be accomplished alternatively or in addition by way of different polarizations.

Figure 11:
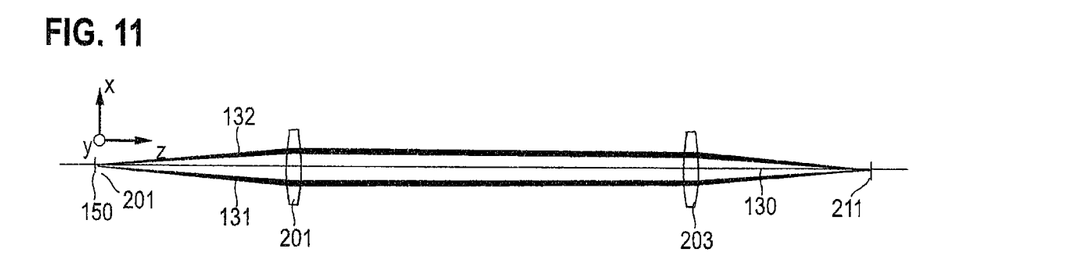
FIGS. 11-13 schematically illustrate rays of a beam path that are filtered by way of different filter patterns.
Figure 12:
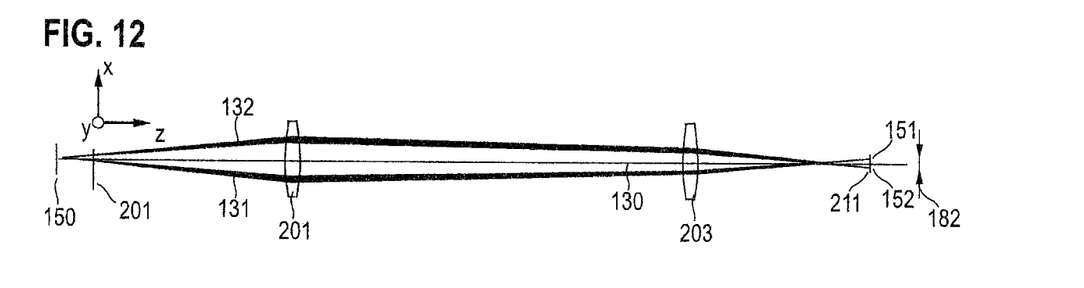
Figure 13:
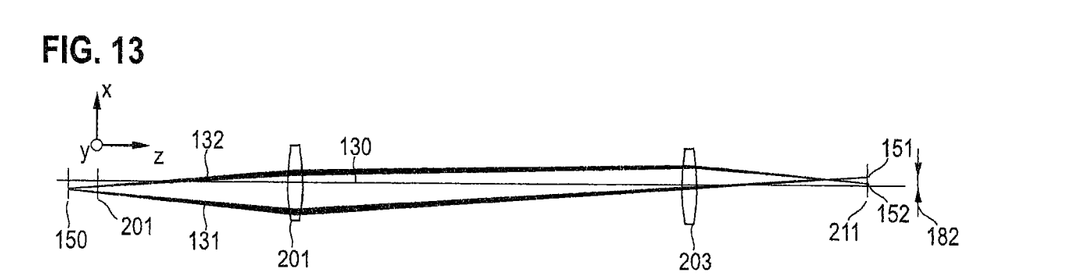

In the various examples described herein, it was illustrated how the focus position 181 of the sample object can be determined based on the distance 182. The sample object can here be displaced along the optical axis 130, that is to say be arranged spaced apart along the Z-direction with respect to the focal plane 201. It is likewise possible for the sample object 150 to have a distance in the X-direction or Y-direction with respect to the optical axis 130. This is illustrated in FIGS. 11-13. In FIG. 11, the sample object 150 is arranged in the focal plane 201, i.e. $\Delta z=0$, $\Delta x=0$. In FIG. 12—which in principle corresponds to FIG. 2—$\Delta z<0$ and $\Delta x=0$. In FIG. 13, $\Delta z<0$ and $\Delta x<0$.

In summary, techniques have been described above which make determination of the focus position of a sample object possible. Fast autofocus applications—even single-shot autofocus applications—can be made possible thereby. Motion artifacts are avoided in this way, and fast focus finding in real-time can be made possible. For example, a user interface could also be driven to output a user instruction based on the determined focus position. For example, the adjustment direction of a sample holder that is to be actuated by the user to bring about focusing could be indicated. This can be helpful in the case of sample holders that are manually adjustable. It is possible to achieve reduced complexity of the hardware in particular as compared to techniques that use an illumination module configured for structured illumination from different illumination directions. In this way, the techniques described herein can be used in a wide variety of applications. In addition, it is possible to determine the focus position for non-telecentric systems, wherein the recording of a z-stack is not necessary. The capture region for determining the focus position is adjustable, in particular it is possible to use comparatively small light-transmissive regions.

The above-described techniques are based on filtering of the spectrum of a beam path close to a conjugate plane of the beam path. Complementary filter patterns are used for filtering to produce a distance between the positions of the imaged representations of the sample object in corresponding images. This corresponds to the selection of different angles of the illumination of a sensor surface of the detector during capturing of the different images, that is to say angle-selective detection is used. The focus position can then be determined on the basis of the distance.

It goes without saying that the features of the embodiments and aspects of the invention described above can be combined with one another. In particular, the features can be used not only in the combinations described but also in other combinations or on their own without departing from the scope of the invention.

For example, examples in which a flat sample object is used were illustrated above. However, it would be possible to use a sample object, extending in the XY-plane, which exhibits a topography.

The invention claimed is:

1. An optical apparatus, comprising:
a detector;
a detection optical unit configured to produce an imaged representation of a sample object on the detector, wherein the detection optical unit comprises an adjustable filter element in a beam path of the detection optical unit, the beam path defining the imaged representation; and
a controller configured to drive the adjustable filter element to filter a spectrum of the beam path with a first filter pattern and with a second filter pattern, and to drive the detector to capture a first image associated with the first filter pattern, and to capture a second image associated with the second filter pattern,
wherein the controller is further configured to determine a focus position of the sample object based on the first image and the second image,
wherein the first filter pattern comprises a first line-shaped transmissive region that is off-axis, and
wherein the second filter pattern comprises a second line-shaped transmissive region that is off-axis.

2. The optical apparatus as claimed in claim 1,
wherein the controller is further configured to drive a user interface of the optical apparatus to output a user instruction based on the focus position.

3. The optical apparatus as claimed in claim 1,
wherein the controller is configured to determine a distance of a position of the imaged representation of the sample object in the first image from a position of the imaged representation of the sample object in the second image, and
wherein the controller is further configured to determine the focus position based on the distance.

4. The optical apparatus as claimed in claim 3,
wherein the controller is configured to determine the distance based on one or more of one-dimensional or two-dimensional correlation of the first image with the second image, object detection of the sample object in the first image and in the second image, and landmark detection in the first image and in the second image.

5. The optical apparatus as claimed in claim 1,
wherein the first filter pattern is transformed into the second filter pattern by translation along a vector.

6. The optical apparatus as claimed in claim 5,
wherein the controller is configured to determine a distance of a position of the imaged representation of the sample object in the first image from a position of the imaged representation of the sample object in the second image,
wherein the controller is further configured to determine the focus position based on the distance, and
wherein the controller is configured to determine the distance based on an orientation of the vector.

7. The optical apparatus as claimed in claim 1,
wherein the first line-shaped transmissive region extends parallel to the second line-shaped transmissive region along at least 50% of its length.

8. The optical apparatus as claimed in claim 1,
wherein the adjustable filter element comprises at least one of a filter wheel, a digital micromirror device, a liquid crystal filter, a movable filter plates, or an amplitude filter element.

9. The optical apparatus as claimed in claim 1,
wherein the first filter pattern allows transmission of light in a first wavelength range or with a first polarization,
wherein the second filter pattern allows transmission of light in a second wavelength range or with a second polarization,
wherein the first wavelength range or the first polarization differs from the second wavelength range or the second polarization,
wherein the first image represents the first wavelength range, and
wherein the second image represents the second wavelength range.

10. The optical apparatus as claimed in claim 1,
wherein the first line-shaped transmissive region of the first filter pattern or the second line-shaped transmissive region of the second filter pattern is formed by a plurality of holes, and
wherein ones of the plurality of holes are spaced apart from one another.

11. The optical apparatus as claimed in claim 1,
wherein the first line-shaped transmissive region of the first filter pattern is straight or curved.

12. The optical apparatus as claimed in claim 1,
wherein the second line-shaped transmissive region of the second filter pattern is straight or curved.

13. A method, comprising:
driving a filter element, which is in a beam path that defines an imaged representation of a sample object, for filtering a spectrum of the beam path with a first filter pattern and with a second filter pattern;
driving a detector to capture a first image associated with the first filter pattern, and to capture a second image associated with the second filter pattern; and
determining a focus position of the sample object based on the first image and the second image, wherein the first filter pattern comprises a first line-shaped transmissive region that is off-axis, and wherein the second filter pattern comprises a second line-shaped transmissive region that is off-axis.

14. An optical apparatus, comprising:
a detector;
a detection optical unit configured to produce an imaged representation of a sample object on the detector, wherein the detection optical unit comprises an adjustable filter element in a beam path of the detection optical unit, the beam path defining the imaged representation; and
a controller configured to drive the adjustable filter element to filter rays of the beam path with a first filter pattern and with a second filter pattern that respectively have a first angle in relation to a sensor surface of the detector and that have a second angle in relation to the sensor surface,
wherein the controller is further configured to drive the detector to capture a first image associated with the rays having the first angle, and to capture a second image associated with the rays having the second angle,
wherein the controller is further configured to determine a focus position of the sample object based on the first image and the second image,
wherein the first filter pattern comprises a first line-shaped transmissive region that is off-axis, and
wherein the second filter pattern comprises a second line-shaped transmissive region that is off-axis.

15. A method, comprising:
driving a filter element in a beam path that defines an imaged representation of a sample object, to filter rays of the beam path with a first filter pattern and with a second filter pattern that respectively have a first angle in relation to a sensor surface of a detector and that have a second angle in relation to the sensor surface;
driving the detector to capture a first image associated with the rays having the first angle, and to capture a second image associated with the rays having the second angle; and
determining a focus position of the sample object based on the first image and the second image,
wherein the first filter pattern comprises a first line-shaped transmissive region that is off-axis, and
wherein the second filter pattern comprises a second line-shaped transmissive region that is off-axis.

16. The optical apparatus as claimed in claim 1,
wherein the adjustable filter element is in a pupil plane of the beam path to form an aperture stop that is offset from the first line-shaped transmissive region and the second line-shaped transmissive region.

17. The optical apparatus as claimed in claim 1,
wherein the first line-shaped transmissive region is off-axis relative to an axis defined by the beam path, and
wherein the second line-shaped transmissive region is off-axis relative to the axis defined by the beam path.

* * * * *